United States Patent [19]
Fukui et al.

[11] Patent Number: 5,019,741
[45] Date of Patent: May 28, 1991

[54] BRUSH HOLDER DEVICE FOR ELECTRIC MOTOR

[75] Inventors: Masashi Fukui, Tochigi; Tomoyuki Shinoda, Gunma, both of Japan

[73] Assignee: Mitsuba Electric Manufacturing Co., Ltd., Gunma, Japan

[21] Appl. No.: 522,818

[22] Filed: May 14, 1990

[30] Foreign Application Priority Data

May 15, 1989 [JP] Japan ................................ 1-55514[U]

[51] Int. Cl.⁵ .............................................. H01R 39/38
[52] U.S. Cl. ..................................... 310/239; 310/240; 310/247; 310/248
[58] Field of Search ................ 310/239, 240, 247, 248, 310/242, 245

[56] References Cited

U.S. PATENT DOCUMENTS 3,745,393  7/1973  Spors .................................. 310/239

FOREIGN PATENT DOCUMENTS 1763883  9/1979  Fed. Rep. of Germany ...... 310/239
2113924  8/1983  United Kingdom ................ 310/239

Primary Examiner—Steven L. Stephan
Assistant Examiner—Mathew Nguyen
Attorney, Agent, or Firm—Oliff & Berridge

[57] ABSTRACT

A brush holder device for an electric motor has a brush holder, a brush movably received in the brush holder, and a spring which acts between the bottom of the brush holder and the outer end of the brush so as to resiliently press the brush into contact with a commutator. The surface of the bottom of the brush holder on which one end of the spring acts and the outer end surface of the brush on which the other end of the spring acts are inclined in opposite directions along the axis of the motor such that the distance between the surfaces is greater at one axial end than at the other axial end of the brush holder. As a result, the spring is naturally urged to and stably held in the axial end where the distance between these two surfaces is greater. In addition, or alternatively, the bottom surface of the brush holder includes a recessed portion for containing the spring at one axial end of the brush holder.

14 Claims, 4 Drawing Sheets

PRIOR ART

BRUSH HOLDER DEVICE FOR ELECTRIC MOTOR

BACKGROUND OF THE INVENTION

1. Field of the Invention

The present invention relates to an electric motor and, more particularly, to a brush holder device for resiliently pressing brushes into sliding contact with a commutator.

2. Description of the Related Art

In general, an electric motor of the type described has brush holder devices each having a brush holder and a brush movably received in the brush holder, with a spring acting between the bottom of the holder and the brush so as to resiliently press the brush into contact with a commutator ring. In order to obtain a large effective area of contact between each brush and the commutator ring, the brush has a substantially rectangular cross section with a considerable dimension in the axial direction of the motor. On the other hand, the spring usually has a generally cylindrical form so that it is often experienced that a large clearance is formed between the brush holder wall and the spring in the direction of the axis of the motor, with the results that the spring is buckled or bent as shown in FIG. 5 or, when a plurality of springs are used, entangled. It is also to be pointed out that, when the brush holder device is assembled, the spring is set in an inclined posture. As a consequence, the state of contact between the brush and the commutator is impaired due to inadequate application of the spring force.

In order to overcome these problems, it has been proposed to use a special spring having an oval or elliptic cross section. The use of such a special spring, however, is not preferred because it has to be designed and produced exclusively for each brush holder, resulting in increased cost.

SUMMARY OF THE INVENTION

Accordingly, an object of the present invention is to provide a brush holder device for an electric motor which can overcome the above-described problems.

To this end, according to the present invention, there is provided a brush holder device for an electric motor having a brush holder, a brush movably received in the brush holder, and a spring which acts between the bottom of the brush holder and the outer end of the brush so as to resiliently press the brush into contact with a commutator, the surface of the bottom of the brush holder on which one end of the spring acts and the outer end surface of the brush on which the other end of the spring acts being inclined in opposite directions along the axis of the motor such that the distance between the surfaces is greater at one axial end than at the other axial end of the brush holder.

According to another aspect of the present invention, utilized separately or in conjunction with the above-described inclined brush and brush holder surfaces, a bottom surface of the brush holder is stepped to provide a recessed portion, and the spring is held within the recessed portion.

According to these arrangements, undesirable buckling or bending of the spring is avoided even when the spring is a general purpose cylindrical spring.

The above and other objects, features and advantages of the present invention will become clear from the following description when the same is read in conjunction with the accompanying drawings.

DESCRIPTION OF THE PREFERRED EMBODIMENTS

Figure 5:
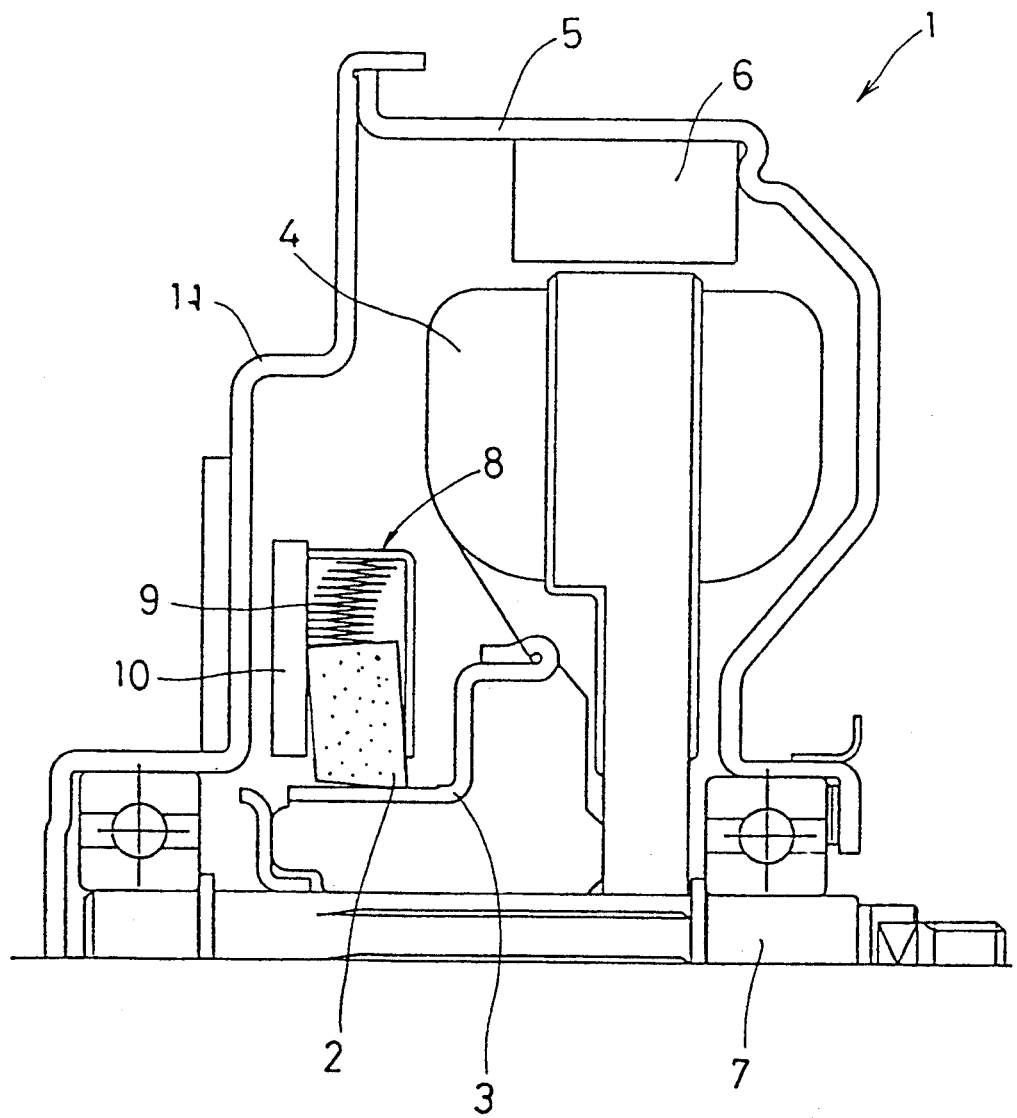
FIG. 5 is a view of a conventional brush holder device.

Referring to FIG. 5, an electric motor 1 as known per se has a commutator 3 which is slidingly contacted by brushes 2, an armature core 4 carrying armature coils wound thereon, yokes 5, permanent magnets 6 fixed to the yokes 5, a shaft 7 to which the commutator 3 is rigidly fixed, brush holders 8 receiving the brushes 2, springs 9 received in the brush holders 8 so as to resiliently urge the brushes 2 into pressure contact with the commutator 3, and so forth. Each brush holder 8 is integrally fixed to a holder support 10 fitted on the inner side of an end bracket 11 which closes the open end of the yokes 5.

Figure 1:
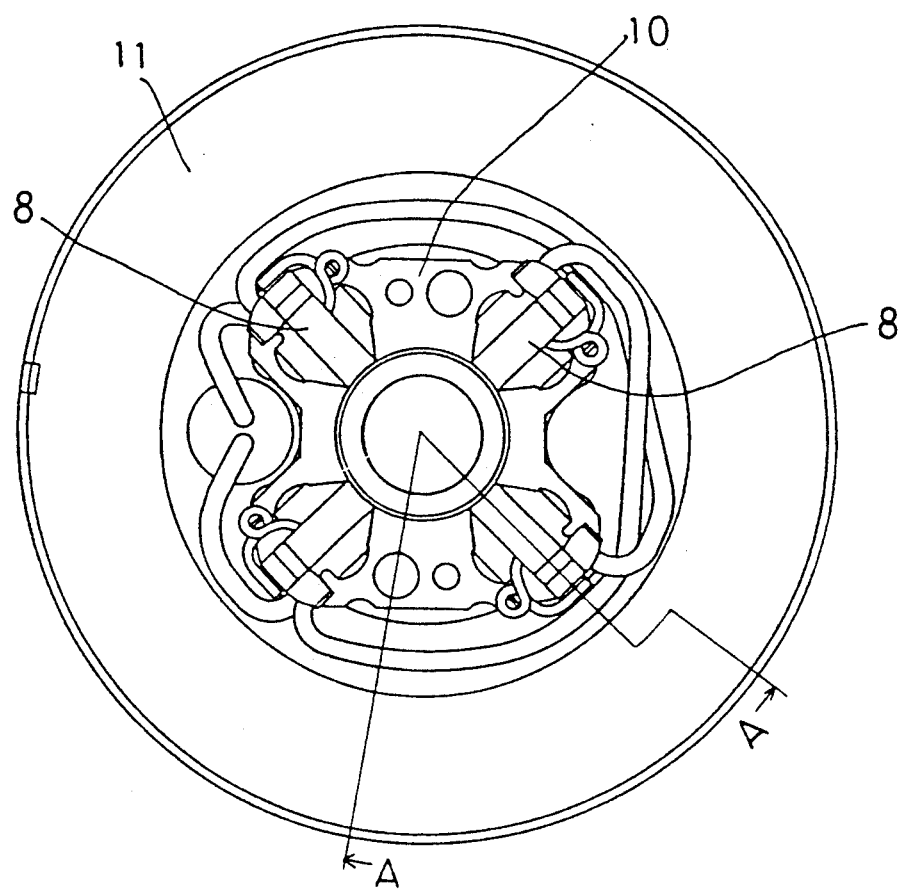
FIG. 1 is a view of an electric motor incorporating a pair of units of the brush holder device of the present invention.
Figure 2:
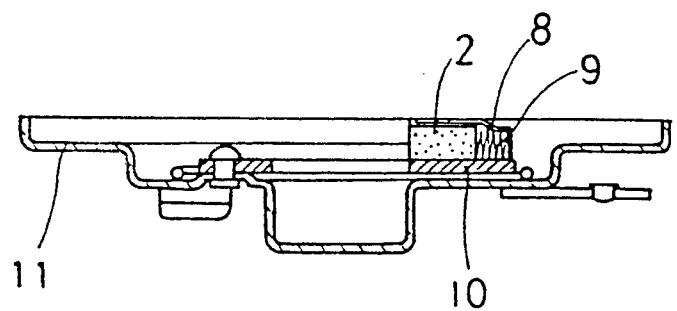
FIG. 2 is a cross-sectional view taken along the line A—A of FIG. 1.
Figure 3:
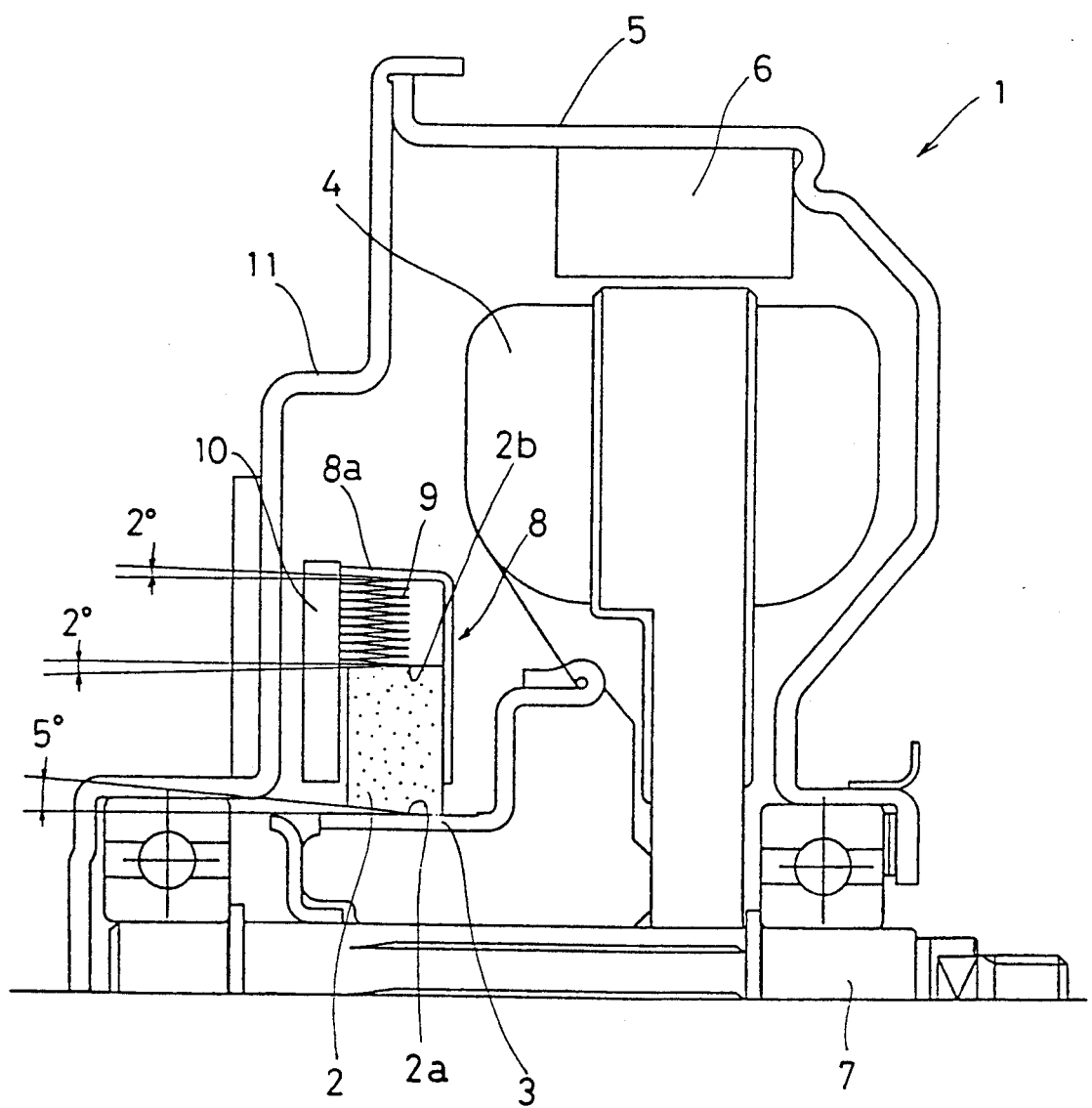
FIG. 3 is a view of the brush holder device embodying the present invention, illustrative of the operation of the brush holder device.

According to the present invention as depicted in FIGS. 1-3, the bottom 8a of the brush holder 8 on which the spring 9 acts is inclined in the direction of the axis of the motor 1 such that the distance between the bottom 8a and the commutator 3 is greater at the axial end of the bottom 8a remote from the armature core 4 than at the axial end of the same adjacent the armature core 4. In the illustrated embodiment, the bottom 8a is inclined at 2° to the axis of the motor.

The surface 2a of the brush 2 contacting the commutator is stepped so as to have a portion substantially parallel to the motor axis and a portion which is inclined at 5° to the motor axis. On the other hand, the outer end surface 2b of the brush on which the spring 9 acts is inclined with respect to the motor axis in the direction opposite to the inclination of the bottom 8a of the brush holder, i.e., such that the axial end of the end surface 2b remote from the armature core 4 is closer to the commutator than is the other axial end. In the illustrated embodiment, the angle of inclination of the brush surface 2b also is 2°. According to this arrangement, the spring 9 loaded between the bottom 8a of the spring holder 8 and the outer end surface 2b of the brush 2 is naturally biased into a position away from the armature core 4 where the distance between the bottom 8a of the brush holder 8 and the outer end surface 2b of the brush 2 is largest, whereby the spring 9 is naturally set so as to extend along the holder support 10 as shown in FIG. 3.

In assembling the motor, the spring 9 and the brush 2 are mounted on the holder support 10 such that the holder support 10 is placed underneath, and the armature core 4 and other parts are fitted on the brush holder assembly thus formed.

In this embodiment, the surface of the bottom 8a of the brush holder 8 and the outer end surface 2b of the brush are inclined such that the distance therebetween increases along the axis of the motor in the direction away from the armature core 4. Therefore, the spring 9 loaded between these surfaces is naturally biased towards the holder support 10, even if it is initially set in the brush holder 8 at a position closer to the wall of the brush holder 8 remote from the holder support 10, i.e., adjacent the armature core 4. As a result, the brush 2 is urged by the spring 9 away from the holder support 10, i.e., towards the wall of the brush holder 8 adjacent the armature core 4 and, at the same time unintentional movement of the spring 9 away from the holder support 10 is avoided. It is therefore possible to avoid undesirable buckling or bending of the spring, as well as entanglement, even when a spring 9 having a circular cross section is loosely fitted in the brush holder 8. In the conventional brush holder device, it is often experienced that the spring becomes unable to adequately press the brush due to buckling, bending or entanglement from the beginning or after the brush has been worn down to a certain degree. This problem also can be eliminated in the described embodiment of the invention.

In the brush holder device of this embodiment, the spring 9 gradually expands in the axial direction thereof as the brush 2 is worn down. Nevertheless, the spring 9 is not moved from the position adjacent the holder support 10 even when vibrated during operation of the motor, since the natural biasing force produced by the inclination of the surface of the bottom 8a of the brush holder and the outer end surface 2b of the brush 2 is still effective. Thus, the spring 9 can act without any buckling or bending even after the brush has worn to a considerable extent. Therefore, the brush 2 can be urged into resilient sliding contact with the commutator 3 and, hence, the posture of the brush 2 with respect to the commutator 3 is maintained for a long period of time, thus offering a high reliability of the brush holder device.

Although a preferred embodiment has been described, it is to be understood that this embodiment is only illustrative and various other embodiments and modifications are possible within the scope of the invention.

Figure 4:
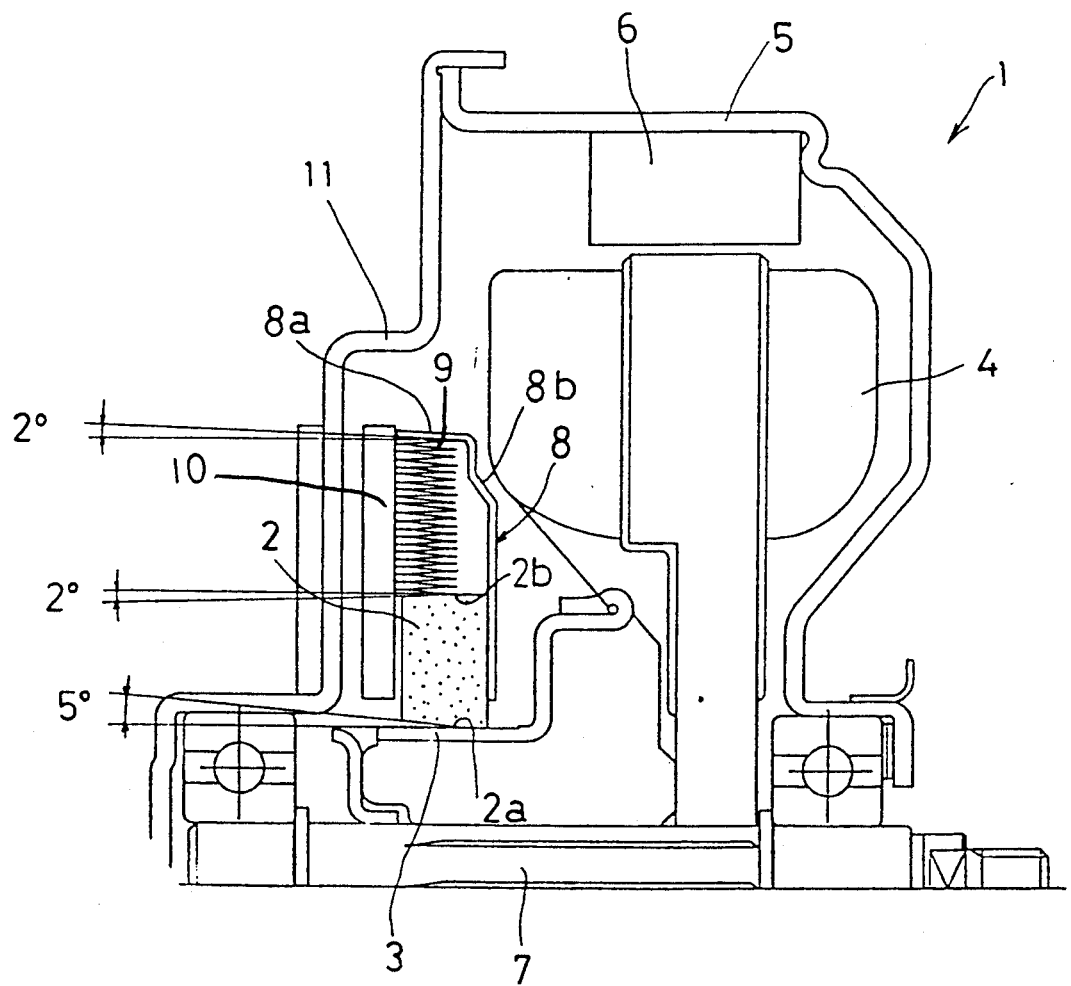
FIG. 4 is a view of another embodiment of the brush holder device embodying the present invention.

FIG. 4 shows another embodiment in which the bottom 8a of the brush holder 8 is stepped at 8b such that a recessed portion is formed in the portion of the bottom 8a adjacent the holder support 10. It will be clear that this embodiment provides a greater effect in stabilizing the position of the spring because the spring is naturally biased into the recessed portion. Although preferably utilized in conjunction with the inclined brush and brush holder surfaces as shown in FIG. 4, the recessed brush holder may also be independently utilized.

It is also to be understood that the tapers of the surface of the bottom 8a of the brush holder 8 and the outer end surface 2b of the brush 2 may be such that the distance between these surfaces is greater at the end adjacent the armature core than at the end adjacent the holder support, although in the described embodiments the tapers are set such that the distance is greater at the end adjacent the holder support. Thus, the advantages of the present invention can be produced when the surface of the bottom of the brush holder and the outer end surface of the brush are inclined in opposite directions along the axis of the motor.

As has been described, according &:o one aspect of the invention the surface of the bottom of the brush holder and the outer end surface of the brush are inclined in opposite directions along the axis of the motor.

Therefore, the spring is naturally urged towards the axial end of the space in the brush holder where the distance between the above-mentioned two surfaces is greater than at the other end. This causes the brush to be urged in the direction opposite to the direction in which the spring is urged. According to another aspect of the invention, the surface of the bottom of the brush holder includes a recessed portion, and the spring is contained at the axial end of the space in the brush holder which includes the recessed portion. Consequently, problems such as buckling, bending or entanglement of the spring are avoided to ensure that the spring exerts a moderate pressing force on the brush, whereby, the brush is stably maintained in good contact with the commutator so as to ensure a stable and good commutation of electric current to offer an improvement in the reliability of the electric motor.

Although the invention has been described through specific terms, it is to be understood that various changes and modifications are possible without departing from the scope of the present invention which is limited solely by the appended claims.

What is claim is:

1. A brush holder device for an electric motor comprising:
   a brush holder having a bottom surface and a space with two axial ends;
   a brush movably received in said brush holder and having inner and outer end surfaces;
   a spring which acts between said bottom surface of said brush holder and said outer end surface of said brush so as to resiliently press said brush into contact with a commutator of said electric motor; and
   means for urging said spring towards one of said axial ends of the space within said brush holder, said spring urging means comprising said bottom surface of said brush holder on which one end of said spring acts and said outer end surface of said brush on which an opposite end of said spring acts being inclined in opposite directions along the axis of said motor such that the distance between said bottom and outer end surfaces is greater at one axial end than at the other axial end of said brush holder.

2. The brush holder device according to claim 1, wherein said bottom surface of said brush holder and said outer end surface of said brush are inclined at 2° to the axis of the motor, respectively.

3. The brush holder device according to claim 1, wherein said spring is held at an axial end of said brush holder where the distance between said bottom and outer end surfaces is the greatest.

4. The brush holder device according to claim 1, wherein said spring urging means comprises a recessed portion in said bottom surface of said brush holder.

5. The brush holder device of claim 4, wherein said spring is held within said recessed portion.

6. The brush holder device according to claim 1, wherein said spring is a coil spring.

7. The brush holder device according to claim 6, wherein a diameter of said coil spring is smaller than said brush so as to act on a portion of said outer end surface of aid brush.

8. The brush holder device according to claim 1, wherein a first portion of the brush holder space which receives said spring is small so as to fit said spring and a second portion of said brush holder space in which the opposite end of the spring acts on said outer end surface of aid brush is wider than said first portion so as to movably receive said brush in the axial direction.

9. A brush holder device for an electric motor comprising:
- a brush holder having a bottom surface;
- a brush movably received in said brush holder and having inner and outer end surfaces; and
- a spring which acts between said bottom surface of said brush holder and said outer end surface of said brush so as to resiliently press said brush into contact with a commutator of said electric motor;
- wherein said bottom surface of said brush holder on which one end of said spring acts and said outer end surface of said brush on which the other end of said spring acts are inclined in opposite directions along the axis of said motor such that the distance between said bottom and outer end surfaces is greater at one axial end than at the other axial end of said brush holder.

10. The brush holder device according to claim 9, wherein said bottom surface of said brush holder is stepped to provide a recessed portion.

11. The brush holder device of claim 10, wherein said spring is held within said recessed portion.

12. The brush holder device according to claim 9, wherein said spring is a coil spring.

13. The brush holder device according to claim 12, wherein a diameter of said coil spring is smaller than said brush so as to act on a portion of said outer end surface of said brush.

14. The brush holder device according to claim 9, wherein a first portion of the brush holder space which receives said spring is small so as to fit said spring and a second portion of said brush holder space in which the opposite end of the spring acts on said outer end surface of said brush is wider than said first portion so as to movably receive said brush in the axial direction.

* * * * *